Aug. 29, 1967   F. C. HOLMES   3,338,112
ADJUSTABLE CAM
Filed Feb. 23, 1966
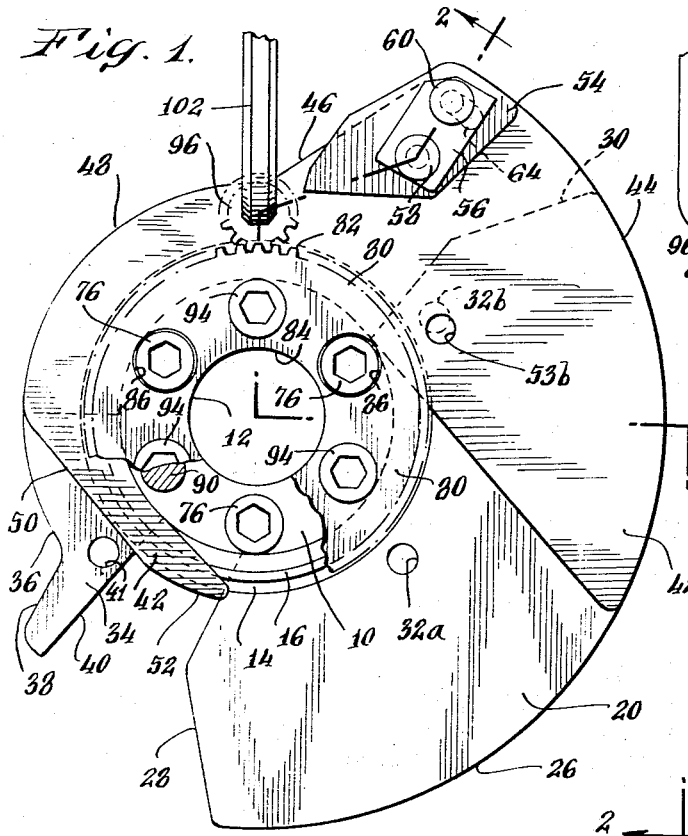
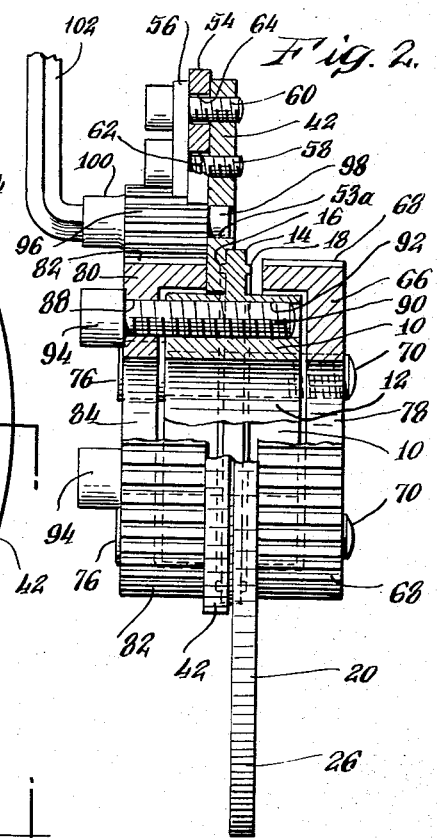
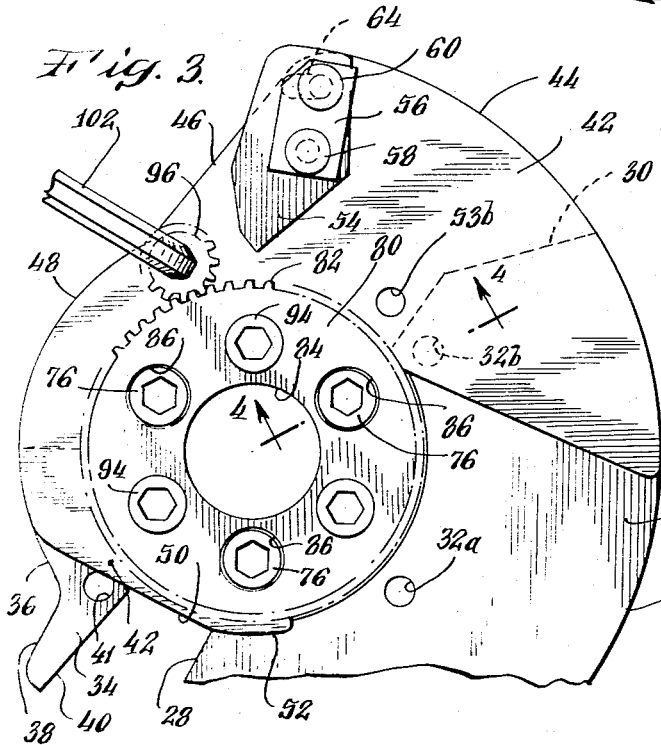
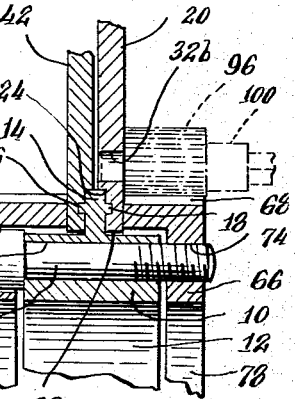
INVENTOR.
Frank C. Holmes
BY
Wooster, Davis & Cifelli
ATTORNEYS.

United States Patent Office 3,338,112
Patented Aug. 29, 1967

3,338,112
ADJUSTABLE CAM
Frank C. Holmes, Trumbull, Conn., assignor to The U.S. Baird Corporation, Stratford, Conn., a corporation of Connecticut
Filed Feb. 23, 1966, Ser. No. 529,458
10 Claims. (Cl. 74—568)

ABSTRACT OF THE DISCLOSURE

An adjustable cam comprising a hub having a gear mounted thereon. A camming member is mounted to be rotated about the hub by a pinion which engages it and the gear. Clamping means secure the camming member in the desired position on the hub.

---

This invention relates to an adjustable cam and, more particularly, to a multi-element cam which is easily and precisely adjustable.

Adjustable cams are known to the prior art. In these cams the camming surfaces are defined by separate elements which are held together by some type of locking arrangement, such as clamping screws. When the screws are loosened, the elements of the cam may be shifted relative to one another by means of manual manipulation, by tapping with a hammer, or in some other manner. Cams of this type are not only inconvenient to adjust but precision is difficult to achieve and damage to the camming elements may occur. Accordingly it is a primary object of the present invention to provide an improved adjustable cam. Other objects are to provide such a cam wherein the camming elements may be shifted with a minimum of effort, with precision, and without the risk of injury to the cam. The manner in which these objects are achieved will be more apparent from the following description, the appended claims, and the figures of the attached drawing, wherein:

FIG. 1 is a front view of a cam constructed in accordance with this invention;

FIG. 2 is a cross section taken substantially along the line 2—2 of FIG. 1;

FIG. 3 is a view similar to FIG. 1 illustrating the manner in which the cam elements are shifted relative to one another; and FIG. 4 is a cross section taken substantially along the line 4—4 of FIG. 3.

The objects of this invention are achieved by means of an adjustable cam which comprises a hub and gear means which are fixed to the hub. A camming member is mounted for selective rotational positioning about the hub. A pinion is provided which is engageable with both the camming member and the gear means and is rotatable to position the camming member relative to the hub. Clamping means are also provided for securing the camming member in a pre-selected position on the hub.

With particular reference to FIGS. 1 and 2 of the drawing there is illustrated an adjustable cam constructed in accordance with this invention comprising a substantially cylindrical hub 10 defining a central opening 12 for engaging a shaft. The hub may be secured to the shaft by conventional means (not shown) such as a set screw or a key. The hub is provided with a radially extending flange 14 which encircles the hub centrally of its two ends. The flange 14 includes a pair of circular raised tracks 16, 18 on its two opposite surfaces. These tracks are of square cross section, as shown in FIG. 2, and are concentric with the hub 10.

Camming members of various shapes are illustrated in the present embodiment. In each instance the camming member is designed to slidably engage one of the tracks 16, 18 of flange 14. Camming member 20, for example, is generally arcuate in shape so that its inner edge 22 (FIG. 4) conforms to the curvature of hub 10. An arcuate recess 24 formed in one side adjacent the edge 22 allows the camming member to partially overlap the flange 14. A circular groove in the recess slidably engages the track 18. The camming edge 26 of camming member 20 has a constant radius between its rise portion 28 and dropoff portion 30. A pair of adjusting holes 32a, 32b are drilled through the cam at angularly spaced positions equally spaced from its inner edge 22.

Mounted against the same side of flange 14 as camming member 20, and also slidably positioned on track 18 by means of a similar recess and groove arrangement, is a smaller camming member 34 which includes a low-radius dwell portion 36, a high rise portion 38 and a drop-off 40. Camming member 34 also includes an adjusting hole 41 on the same radius as holes 32a, 32b.

Still another camming member 42 is substantially U-shaped and is positioned on the opposite side of flange 14 from camming members 20 and 34. Camming member 42 is similarly recessed to engage the flange 14 and is grooved to be slidable along the track 16. A pair of adjusting holes 53a and 53b are provided in camming member 42 at angularly spaced positions on the same radius as holes 32a, 32b and 41. One leg of the U-shaped camming member 42 forms a high radius dwell portion 44 which is circularly aligned with the camming edge 26 of camming member 20. The high radius dwell portion 44 communicates by means of a drop-off 46 with a low radius dwell portion 48 which is aligned with the low radius dwell 36 of camming member 34. The remaining leg of the camming member 42 comprises a gradual drop-off 50 to an even lower radius dwell 52. In the disclosed embodiment, the drop-off 46 is made adjustable by means of a supplemental member 54. Member 54 is secured to the camming member 42 by means of a clamping plate 56 and screws 58, 60 which engage threaded openings in camming member 42. Screws 58, 60 extend, respectively, through a pivot opening 62 and an arcuate opening 64 in the supplemental member 54.

Mounted against the right hand end of hub 10, as seen in FIG. 2, is a cup-shaped first adjusting gear 66. Gear 66 carries gear teeth 68 around its outer periphery and is mounted to bear against camming member 20 by means of three socket head screws 70 which extend through spaced passages 72 (FIG. 4) in hub 10 to engage three internally threaded holes 74 in gear 66. The heads 76 of screws 70 bear against the left end of hub 10. The adjusting gear 66 also defines a shaft opening 78 aligned with the opening 12 in the hub 10. It will thus be seen that tightening of screws 70 forces the first adjusting gear 66 axially inwardly along the hub 10, causing it to bear tightly against the camming members 20 and 34, thus clamping them in position against flange 14.

A somewhat similar arrangement is provided on the opposite end of the hub for clamping camming member 42. For this purpose, a second cup-shaped adjusting gear 80, having gear teeth 82 is mounted on the opposite end of hub 10 from gear 66. Gear 80, like gear 66, defines a shaft opening 84. However, it differs in that six equally spaced openings are provided in its end face. Three of these openings 86 are sufficiently large to receive the screw heads 76. The remaining three openings 88 are smaller so as to receive the shanks of screws 90 which threadedly engage matching holes 92 in the hub 10. The heads 94 of these screws rest against the end face of the second adjusting gear 80. It will thus be seen that tightening of screws 90 will force second adjusting gear 80 inwardly along the hub 10 to clamp camming member 42 against flange 14.

Adjustments in the cam of this invention are made by means of a small pinion gear 96 having a stud 98 extending axially from one end of a size to be rotatable within the adjusting holes of the camming members. The other end of the pinion gear 96 is provided with a projection 100 defining a hexagonal opening for receiving the end of an Allen wrench 102.

The manner of adjusting the camming members will now be described. Assuming the camming members to be clamped in the positions illustrated in FIGS. 1 and 2 and assuming further that an adjustment of camming member 42 is desired, the screws 90 are first loosened slightly to lessen the clamping pressure against camming member 42. The stud 98 of pinion gear 96 is then inserted into adjusting hole 53a. In this position, it will be noted that the teeth of pinion gear 96 mesh with teeth 82 of gear 80. Using Allen wrench 102, the pinion is then rotated to the position illustrated in FIG. 3. As gear 80 is fixed to hub 10, the pinion 96 is caused to roll around the periphery of gear 80, carrying with it camming member 42 which slides along the track 16 to the new position illustrated in FIG. 3. When the desired setting has been reached it is merely necessary to retighten screws 90, thereby clamping the camming member 42 in its new position.

In order to adjust the camming members 20 or 34 the screws 70 are loosened. To reposition camming member 20 the pinion 96 is inserted with its stud in adjusting hole 32a or 32b as shown in FIG. 4. The pinion is rotated until the camming member reaches the desired setting and it is then clamped in place by retightening screws 70. A similar adjustment may be made to camming member 34 by utilizing adjusting hole 41.

In the disclosed embodiment, an adjustment of the drop-off from the high radius dwell of camming member 42 may also be effected. This is accomplished by loosening screws 58 and 60 and pivoting the supplemental member 54 by rotating it about screw 58 so that its arcuate opening 64 slides along screw 60. After pivoting to its new position, as shown in FIG. 3, screws 58 and 60 are tightened to hold the supplemental member 54 in position.

It is now believed that the many advantages of this new invention will be apparent to those skilled in the art. It will be noted, for example, that a rapid and precise adjustment of the camming members may be effected without damaging the members and while simultaneously retaining sufficient clamping action to prevent inadvertent movement away from the desired position. The completely counterbored screws 70 in the cam assembly clamp the bottom camming members 20, 34 and those not counterbored (90) clamp the upper camming member 42. By this arrangement it is possible to adjust either camming member without disturbing the position of the other. This feature is extremely important during the process of setting up or tooling for different samples. It will also be apparent that various modifications may be made in this invention without departing from its spirit and scope. Accordingly, the foregoing description is intended to be construed as illustrative only, rather than limiting. This invention is limited only by the scope of the following claims.

What I claim as new and desire to secure by Letters Patent of the United States is:

1. An adjustable cam which comprises: hub means having a first and a second end; gear means fixed to said hub means; first and second camming members mounted for overlapping selective rotational positioning about said hub means; both of said camming members and said gear means being configured and disposed to be engageable by pinion means from the first end of said hub means and rotatable thereby to position either of said camming members relative to said hub means; and first and second clamping means for respectively clamping said first and second clamping camming members in preselected positions on said hub means, both of said clamping means being actuatable from the first end of said hub means.

2. The cam of claim 1 wherein said hub means is substantially cylindrical and wherein said gear means comprises a pair of gears mounted on opposite ends of the hub means.

3. An adjustable cam which comprises: substantially cylindrical hub means; a pair of substantially cup-shaped gears mounted on opposite ends of the hub means, each of said gears enclosing one end of the hub means therein; at least one camming member mounted for selective rotational positioning about said hub means; said camming member and said gears being configured and disposed to be engageable by pinion means and rotatable thereby to position said camming member relative to said hub means; and means for clamping said camming member in a preselected position on said hub means.

4. An adjustable cam which comprises: hub means including a flange extending radially outward around its periphery; first and second cup-shaped gears, each enclosing one end of said hub means; at least one camming member mounted for selective rotational positioning about said hub means; said camming member and said gear means being configured and disposed to be engageable by pinion means and rotatable thereby to position said camming member relative to said hub means; and means for clamping said camming member in a preselected position on said hub means.

5. The cam of claim 4 wherein each of said camming members comprises a plate-like element mounted between said flange and the rim end of one of said cup-shaped gears.

6. The cam of claim 5 wherein said means for clamping comprises screw means interconnecting said hub means with each of said gears.

7. An adjustable cam which comprises: hub means including a flange extending radially outward around its periphery and defining first and second circular track means on opposite sides thereof encircling said hub means; first and second cup-shaped gears, each enclosing one end of said hub means; at least one plate-like camming member mounted between said flange and the rim end of one of said cup-shaped gears and slidable along one of said track means; said camming member and said gears being configured and disposed to be engageable by pinion means and rotatable thereby to position said camming member relative to said hub means; and means for clamping said camming member in a preselected position on said hub means.

8. The cam of claim 7 wherein each of said camming members defines an adjusting hole spaced from the teeth of said gear means and the pinion means is engageable with said adjusting hole and said teeth.

9. The cam of claim 8 wherein said means for clamping comprises screw means interconnecting said hub means with each of said gears.

10. An adjustable cam which comprises: substantially cylindrical hub means including a radially outwardly extending flange around its periphery intermediate its axial ends having first and second circular tracks formed on opposite sides thereof encircling said hub means; a pair of substantially cup-shaped gears mounted on opposite ends of said hub means; a plurality of plate-like cam members recessed to be individually mountable on one of said tracks between said flange and the rim end of one of said gears; said cam members and said gears being configured and disposed to be engageable by pinion means and rotatable thereby to position said cam members relative to said hub means; and screw means interconnecting said hub means with said gears.

References Cited

UNITED STATES PATENTS

| | | | |
|---|---|---|---|
| 1,524,461 | 1/1925 | Speer | 74—568 |
| 2,477,587 | 8/1949 | Doutt | 74—571 |
| 3,289,494 | 12/1966 | Gaffney | 74—568 |

FRED C. MATTERN, Jr., *Primary Examiner.*

UNITED STATES PATENT OFFICE
CERTIFICATE OF CORRECTION

Patent No. 3,338,112                          August 29, 1967

Frank C. Holmes

It is hereby certified that error appears in the above numbered patent requiring correction and that the said Letters Patent should read as corrected below.

Column 3, line 73, strike out "clamping --.

Signed and sealed this 3rd day of September 1968.

(SEAL)
Attest:

Edward M. Fletcher, Jr.                        EDWARD J. BRENNER
Attesting Officer                                Commissioner of Patents